United States Patent [19]
Bornzin

[11] 3,822,951
[45] July 9, 1974

[54] DRIVE SHAFT COUPLER
[75] Inventor: James H. Bornzin, La Grange, Ill.
[73] Assignee: International Harvester Company, Chicago, Ill.
[22] Filed: May 26, 1972
[21] Appl. No.: 257,403

[52] U.S. Cl................ 403/316, 403/322, 403/325
[51] Int. Cl............................................. F16d 1/00
[58] Field of Search......... 285/314, 277; 287/119 R, 287/DIG. 5; 403/322, 325, 315, 316, 317; 64/32 R, 4, 6

[56] References Cited
UNITED STATES PATENTS
2,006,833  7/1935  Jensen ............................. 285/277
3,083,042  3/1963  Collar ............................ 285/314 X
3,480,310  11/1969 McElwain ........................ 287/119
3,551,013  12/1970 Trojanowski et al. ............ 287/119
3,733,854  5/1973  Young et al. ...................... 64/32

OTHER PUBLICATIONS
Using Your Fully Shielded Universal Joint, dated July 1971, by John Deere.

Primary Examiner—Andrew V. Kundrat
Attorney, Agent, or Firm—Dennis K. Sullivan; Floyd B. Harman

[57] ABSTRACT
A drive shaft knuckle coupler having a hub with a splined shaft-admitting bore and a series of locking detents pocketed in radial openings in the hub. The detents project into the bore to lock into an annular groove in the shaft. A cam ring is rotatable about the hub and has relieved areas alignable with the detents to permit exit of the detents from the bore to release the shaft. An outer ring with a latch is provided to releasably lock with the cam ring and locate it in release and set positions.

6 Claims, 6 Drawing Figures

DRIVE SHAFT COUPLER

DISCUSSION OF THE PRIOR ART

Prior art devices of the type under consideration provide a sleeve which is telescoped over a knuckle hub and spring-biased to locking position axially of the hub. In order to release the locking elements, which are held in locking position with the drive shaft, the sleeve must be retracted against the action of a spring axially of the knuckle and is held against the load of the spring while the knuckle is rotated to mesh the splines on the knuckle and shaft and then the knuckle must be sleeved onto the shaft in the same direction that the load on the sleeve is being applied. Since the sleeve must be axially displaced an extra length of hub must be provided to accommodate the displacement which in turn increases the overall length requirement and thereby makes it more difficult to arrange the parts for connection to the shaft to meet ASAE standards which specify the following dimensions:

Dimensions from the end of PTO shaft to hitch point of drawbar.

| | |
|---|---|
| 14 inches | 540 RPM |
| 1-3/8" dia. shaft 16 inches | 1000 RPM |
| 1-3/4" dia. shaft 20 inches | 1000 RPM |

During extension it is also desirable to have at least 4 inches of telescope of the knuckle and PTO shaft when underload.

The use of locking pins which extend through the knuckle chordally with respect to the drive shaft bore is also common. The problems inherent in this device is that the pin becomes rusted and is difficult to dislodge and furthermore, presents a safety hazard since it may serve as a hook in catching a bystander's clothing.

SUMMARY OF THE INVENTION

This invention is concerned with a novel power-take-off (PTO) coupler which is relatively easy to set and connect and disconnect.

A specific object is to provide a coupler in which parts are relatively rotatable about the coupler and which includes an outer ring which serves as a shield when the coupler is in use and which comprises means for locking it to other parts for connection and disconnection with respect to the PTO shaft.

Another object is to provide a novel coupler which comprises a knuckle hub having a splined bore and a plurality of radial apertures extending through the hub from the bore, the apertures receiving locking detents which are movable into the bore for locking in a groove of a PTO shaft and movable out of the groove to release the shaft, the detents being held by a rotatable cam ring sleeved on the hub in locking position and being encompassed by a collar rotatable thereon, the collar having means for releasably locking the same with the ring to selectively move the cam ring to the locked and unlocked positions.

These and other objects and advantages inherent in and encompassed by the invention will become more wherein.

DESCRIPTION OF THE INVENTION

Figure 1:
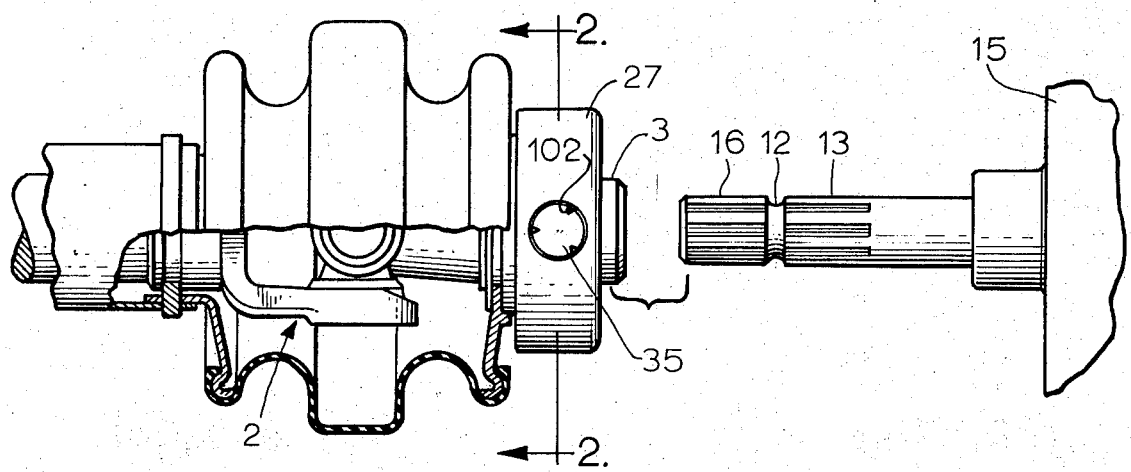
FIG. 1 is a side elevational view partly in axial section of a drive line assembly incorporating the invention.
Figure 2:
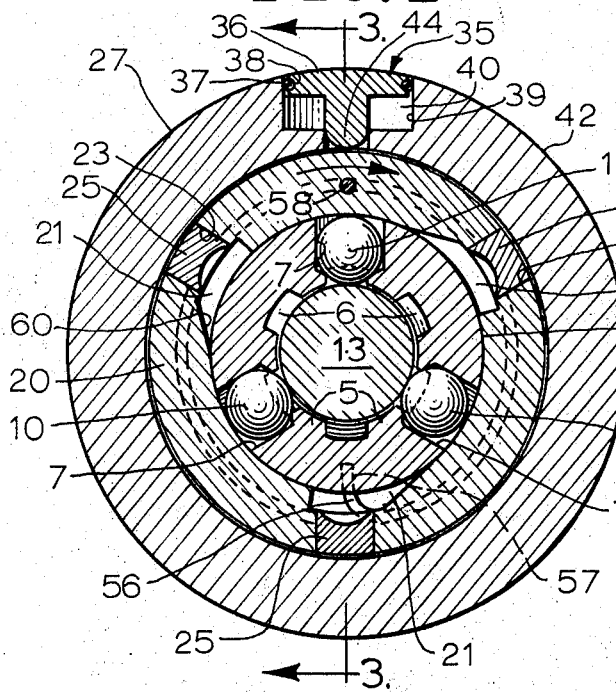
FIG. 2 is an enlarged transaxial sectional view of the coupler taken substantially on line 2-2 of FIG. 1.
Figure 3:
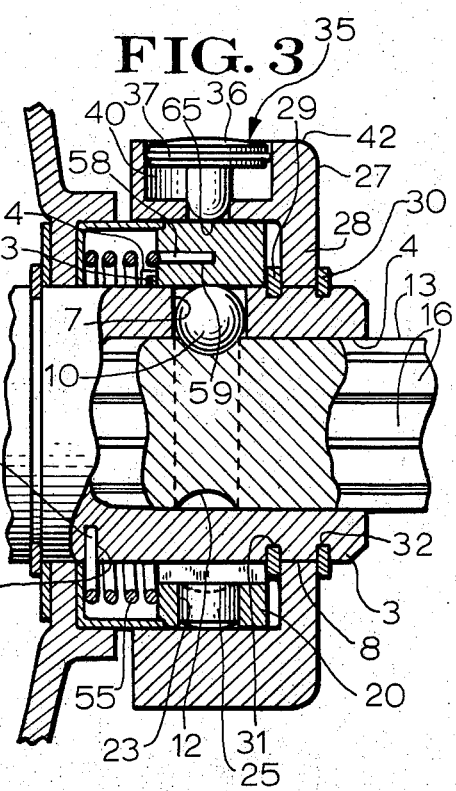
FIG. 3 is an axial section taken substantially on line 3—3 of FIG. 2.

Referring to the drawings, there is shown a coupler or knuckle generally designated 2 having a hub 3 with an axial bore 4 which has a plurality of axially extending circumferentially displaced splines 5, 5 defining intervening grooves or slots 6, 6.

The hub is provided with preferably three radial openings or apertures 7, 7 extending from the bore 4 to the annular outer periphery 8. Each opening receives a detent 10 which is shown in this embodiment as a ball of a diameter closely fitting the diameter of the respective opening 7.

Figure 4A:
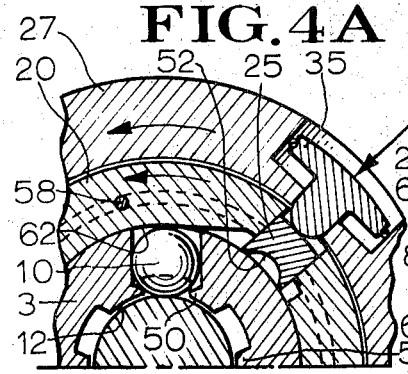
FIGS. 4A, 4B and 4C are fragmentary sectional views comparable to FIG. 2 showing the parts in different positions.

The balls in locking position as shown in FIG. 4A extend into the bore 4 and project into a circumferential notch or groove 12 of a PTO shaft 13 which is mounted on a tractor fragmentarily shown at 15.

The PTO shaft has splines 16 which are arranged to fit between splines 5, 5 into respective slots 6, 6 through axial movement of the knuckle onto the shaft.

The balls are held in locking position by a cam ring 20 which has a plurality of pockets 21, 21 interrupting its inner cylindrical periphery which closely fits onto the hub periphery 8. To unlock the coupler the ring 20 is rotatable on the hub to radially align the pockets 21, 21 with respective openings 7, 7 as best seen in FIG. 4B.

Outwardly of each of the pockets 21 there is provided a radial opening 23 in which there is fitted a detent pin 25 which is slidable axially into and through said pocket 21 and into and out of the related ball-carrying opening 7 outwardly of the associated ball which is in locking position.

A shielding collar 27 is sleeved over the cam ring and has a flange 28 which extends to adjacent the periphery of the hub and is interlocked therewith against axial displacement by a pair of axially spaced locking rings 29 and 30 which are snapped into grooves 31, 32 in the periphery 8 of the hub and embrace the flange 28 which is axially aligned with the cam ring and extends in front thereof in shielding relation thereto.

Figure 4B:
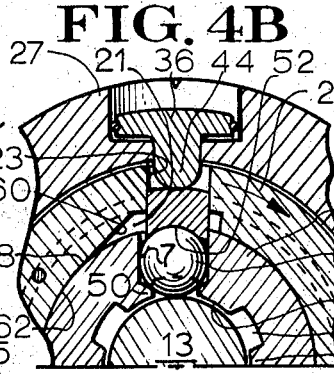
Figure 4C:
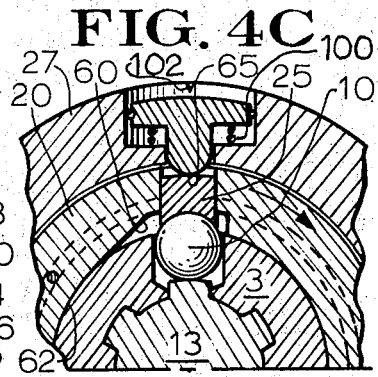

The normally free running or rotating collar 27 is adapted to be locked against rotation with respect to the cam ring and is provided with a lock 35 which, in FIGS. 4A to 4C comprises a push button 36 with an O-ring 37 nested in a peripheral groove 38. The ring 37 fits tightly and is deformed between a wall surface 39 of a radial bore 40 in the collar, the bore 40 being open through the periphery 42 of the collar 27 via which the button is adapted to be pushed inwardly into bore 40 thus advancing a bolt 44 attached to the button against the detent pin 25 whereupon the detent pin is displaced inwardly by the bolt into the selected opening 7 when brought into alignment therewith.

In operation, assuming the parts are set in the position shown in FIG. 4B preparatory to insertion of the PTO shaft into the knuckle, it will be observed that the balls are freely movable within the respective openings 7, but prevented from escaping into the bore 4 by the shoulder 50 at the inner end of each opening 7. The ball which is in alignment with the detent pin 25 is captured between the shoulder 50 and the pin 25 which has entered the outer end of the respective opening 7. The pin 25 has a socket 52 on its inner end into which the upper section of the ball enters and the inner section of this ball projects into the bore 4. The outer collar and the cam ring are releasably locked. The knuckle hub is then sleeved onto the PTO shaft whereupon the splines on the PTO shaft, as they pass the balls during insertion into the hub, displace the balls radially outwardly. The ball aligned with the detent pin displaces such pin outwardly from opening 7 and releases the cam ring which is spring biased to rotate in the direction of the arrow by a torsion spring 55 which is wrapped about the hub periphery 8 and has one end 56 hooked into an opening 57 in the hub and the other end 58 hooked into an opening 59 in the cam ring.

The spring causes the cam ring to rotate in the direction of the arrow and engage the cam surfaces 60 in the pockets with the respective balls. As soon as the balls are aligned with the annular groove 12 in the PTO shaft they are forced inwardly by the respective cam surfaces 60 which slope inwardly toward the periphery of the hub.

The cam ring rotates until the stop 63 on the ring engages stop 64 on the hub at which position the surface portions 62 align with the balls to prevent their retraction. The PTO shaft and knuckle are thus locked.

To release the PTO shaft, the outer collar is rotated by the user while pressing the button inwardly. As soon as the rounded or spherical end 65 of the bolt 44 locates the opening 23 mounting the pin 25, it enters such opening interlocking the collar and cam ring. The operator then rotates the collar and ring together against the resistance of the torsion spring while holding down the button to cause the detent pin 25 to ride upon the periphery 8 of the hub until the pin 25 aligns with the next opening 7 into which it enters thus locking the cam ring in a release position with the pockets 21 in alignment with the respective openings 7. The operator then proceeds to pull the knuckle off the shaft displacing the balls off the annular groove 12 and causing the splines inwardly thereof to push the balls in the respective openings 7 whereupon the detent pin 25 is pushed out releasing the cam ring and pushing the bolt 44 out of the opening 23 whereupon the collar is unlocked from the cam ring. The cam ring rotates pursuant to the action of the torsion spring in a direction advancing the sloping cam surfaces 60 over the respective balls urging them inwardly. The cam ring continues to rotate until the stops 63, 64 engage whereat the surface portions 62 align with the balls.

To reset the device, the operator performs the same steps as in releasing the PTO shaft as stated before.

It will be realized that a spring 100 may be interposed between the button 36 and an opposing shoulder in bore 40 to constantly bias the lock outwardly as best seen in FIG. 4C, the button being prevented from escaping by upset stops or retainers 102.

It will be realized that only one element 25 and opening 23 needs to be provided and the others eliminated.

What is claimed is:

1. In a coupler for connecting a pair of shafts at least one of which has splines and a circumferential locking groove comprising:

a hub with a cylindrical shaped outer surface having means for connection to the other of the shafts and having an axial bore with splines therein for meshing with the splines of said one shaft pursuant to insertion of said one shaft in said bore;

detent means mounted in a radially extending opening in the hub intersecting said bore and adapted to enter into said groove for interlocking the one shaft with said hub;

a cam ring rotatably mounted on said cylindrical surface and having a pocket alignable with said detent means to accommodate withdrawal of the detent means from said locking groove, said cam ring having a camming surface defining a side of the pocket sloping generally tangentially toward said cylindrical surface for engagement with the detent means for urging the same into locking position into the bore attendant to rotation of the cam ring in a predetermined camming direction;

means for biasing said ring in said predetermined camming direction;

a collar rotatably mounted about said cam ring and having means for releasably locking the collar with the cam ring to accommodate rotation of both the cam ring and collar together to unlocking position of the cam ring; and means for releasably locking the cam ring with said hub and releasably maintaining said cam ring in release position with said pocket aligned with said detent means.

2. The invention according to claim 1 and said means for releasably holding the cam ring in release position comprising a detent pin slidably mounted in the cam ring and pursuant to rotation of the cam ring alignable with said radial opening in said hub and movable thereinto behind the detent means and slidable out of said opening by the detent means being moved outwardly from the bore during insertion of the one shaft thereinto whereby upon the groove in the one shaft being radially aligned with the detent means said detent means being urged thereinto to locking position with the one shaft.

3. The invention according to claim 1 and said means for releasably maintaining said cam ring in said release position being operably associated with said means for interlocking the collar with the cam ring and operable thereby to locking position with said hub.

4. The invention according to claim 3 and said means for releasably maintaining said cam ring in release position having an operable association with said means for releasably locking the collar with said cam means for releasing said last mentioned means attendant to release thereof of said cam ring.

5. In a drive line coupler comprising a hub having a splined bore, radial detent-mounting openings intersecting the bore, and detents in the openings extending into the bore in locking position for locking with a splined shaft inserted therein and movable out of the bore for releasing such shaft, the improvement comprising a cam ring rotatably mounted on the hub and having circumferentially displaced relieved pocket portions and close fitting locking portions facing the hub for respectively opening and closing the openings attendant to alignment of respective portions with respective openings, means for biasing the ring to position closing the openings, and detent means on the ring actuable to locking position into one of said openings upon said ring being disposed in released position.

6. The invention according to claim 5 and said detent means on the ring comprising a pin mounted in a radial opening in the ring and alignable with an opening in the hub, and a shield member rotatably mounted about the cam ring and having a manually actuable detent adapted to be dextrally urged inwardly and aligned with the detent means opening on the cam ring to partially enter thereinto and interlock with the cam ring to permit rotation of the shield and cam ring to a release position of the cam ring in which position the detent pin on the cam ring is aligned with one of the radial openings in the hub and partially entered thereinto whereby locking the cam ring to the hub.

* * * * *